US011928250B2

(12) United States Patent
Karri et al.

(10) Patent No.: US 11,928,250 B2
(45) Date of Patent: Mar. 12, 2024

(54) SECURING VISIBLE DATA

(71) Applicant: INTERNATIONAL BUSINESS MACHINES CORPORATION, Armonk, NY (US)

(72) Inventors: Venkata Vara Prasad Karri, Visakhapatnam (IN); Abhishek Jain, Baraut (IN); Pardeep Singh, Pune (IN); Rakesh Chinhara, Pune (IN)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 17/358,332

(22) Filed: Jun. 25, 2021

(65) Prior Publication Data

US 2022/0414272 A1 Dec. 29, 2022

(51) Int. Cl.
*G06F 21/84* (2013.01)
*G06F 21/31* (2013.01)
*G06F 21/57* (2013.01)
*G06F 21/60* (2013.01)

(52) U.S. Cl.
CPC ............. *G06F 21/84* (2013.01); *G06F 21/31* (2013.01); *G06F 21/577* (2013.01); *G06F 21/602* (2013.01); *G06F 2221/2103* (2013.01)

(58) Field of Classification Search
CPC ........ G06F 21/84; G06F 21/31; G06F 21/577; G06F 21/602; G06F 2221/2103
USPC .......................................................... 726/26
See application file for complete search history.

(56) References Cited

U.S. PATENT DOCUMENTS

| 6,959,389 B1* | 10/2005 | Dunn .................... H04M 3/382 380/42 |
| 9,747,500 B2 | 8/2017 | Andersen |
| 10,504,289 B2 | 12/2019 | Yildiz |
| 2002/0101988 A1* | 8/2002 | Jones .................... H04L 9/3228 380/54 |
| 2003/0108198 A1* | 6/2003 | Lahiri ..................... G06F 21/84 380/54 |
| 2015/0037781 A1* | 2/2015 | Breed ...................... G09B 7/00 434/362 |
| 2017/0255786 A1* | 9/2017 | Krishnamurthi ........ G06F 21/32 |
| 2018/0375660 A1 | 12/2018 | Yildiz |
| 2020/0219023 A1 | 7/2020 | Duchastel |

(Continued)

FOREIGN PATENT DOCUMENTS

JP 2017191293 A * 10/2017

OTHER PUBLICATIONS

Disclosed Anonymously, "An anti-spy methodology to protect secret data on the screen", IPCOM000236833D, May 19, 2014, 4 Pages, https://priorart.ip.com/IPCOM/000236833.

(Continued)

*Primary Examiner* — Jacob Lipman
(74) *Attorney, Agent, or Firm* — Rakesh Roy

(57) ABSTRACT

A method, computer system, and a computer program product for securing visible data is provided. The present invention may include encrypting an on-screen data rendered on a display of an endpoint device. The present invention may also include authenticating an external decryption device within a periphery defined by the endpoint device. The present invention may further include decrypting the encrypted on-screen data on the authenticated external decryption device.

17 Claims, 8 Drawing Sheets

(56) References Cited

U.S. PATENT DOCUMENTS

2020/0349296 A1* 11/2020 Young .................... G09C 5/00
2021/0195160 A1* 6/2021 Gu ....................... H04N 13/161

OTHER PUBLICATIONS

Disclosed Anonymously, "Protect Confidential Information with Intelligent Glasses", IPCOM000262742D, Publication Date: Jun. 25, 2020, 2 Pages, https://priorart.ip.com/IPCOM/000262742.
Forte, "EyeDecrypt—Private Interactions in Plain Sight", Proc. 9th Conference on Security and Cryptography for Networks, 2014, 19 Pages, https://www.researchgate.net/publication/270452295.
Mell et al., "The NIST Definition of Cloud Computing", Recommendations of the National Institute of Standards and Technology, NIST Special Publication 800-145, Sep. 2011, 7 pages.

* cited by examiner

SECURING VISIBLE DATA

BACKGROUND

The present invention relates generally to the field of computing, and more particularly to data security.

Data security is critical to every organization's success. Many organizations struggle to secure their critical data within their own premises as well as off-premises for various security compliance reasons. As remote work becomes more prevalent, portable endpoint devices, such as, laptops, tablets, and other handheld devices are increasingly used by organizations due to the ease of mobility and accessibility of these endpoint devices. However, the same ease of mobility and accessibility features of these endpoint devices may also provide a security risk because users can access the organization's data anywhere by connecting to any public or private internet network.

SUMMARY

Embodiments of the present invention disclose a method, computer system, and a computer program product for securing visible data. The present invention may include encrypting an on-screen data rendered on a display of an endpoint device. The present invention may also include authenticating an external decryption device within a periphery defined by the endpoint device. The present invention may further include decrypting the encrypted on-screen data on the authenticated external decryption device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
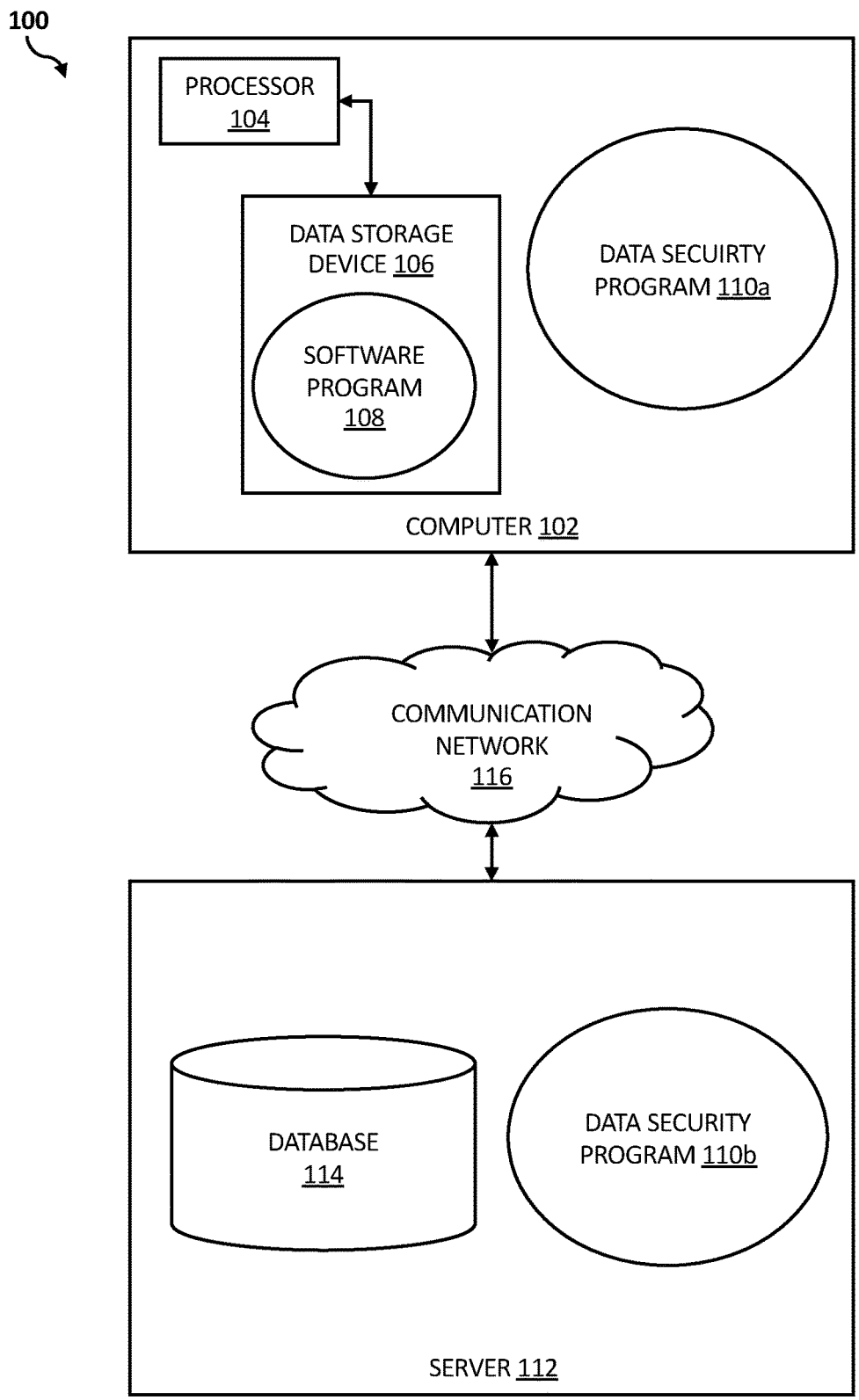
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for securing visible data displayed on an endpoint device. As such, the present embodiment has the capacity to improve the technical field of data security by enabling an authorized user to see a secured data displayed on an endpoint device while preventing an unauthorized user, in the field of view of the endpoint device, from seeing the secured data displayed on the endpoint device. More specifically, a data security program may encrypt on-screen data displayed on an endpoint device. Then, the data security program may authenticate an external decryption device within a periphery of the endpoint device for accessing the encrypted on-screen data. Next, the data security program may decrypt the encrypted on-screen data on the authenticated external decryption device.

As described previously, data security is critical to every organization's success. Many organizations struggle to secure their critical data within their own premises as well as off-premises for various security compliance reasons. As remote work becomes more prevalent, portable endpoint devices, such as, laptops, tablets, and other handheld devices are increasingly used by organizations due to the ease of mobility and accessibility of these endpoint devices. However, the same ease of mobility and accessibility features of these endpoint devices may also provide a security risk because users can access the organization's data anywhere by connecting to any public or private internet network.

To mitigate some of the security risks, organizations may provide their users with a virtual private network (VPN) and/or firewall to enable secure data communication and may require multi-factor authentication (MFA) to secure data access on the endpoint devices. In addition, existing technologies may enable backing up data from an endpoint devices to secure cloud or on-premise storage so that the data, even if lost or compromised, may still be restored onto the endpoint device. Some organizations may also monitor and analyze data on the overall state of their system, including endpoint devices and connectivity traffic, to detect possible security violations or potential system threats based on anomalies in the data.

However, existing solutions are unable to secure data which may be rendered on a computer screen of an endpoint device, such as, patterns drawn on a tablet surface or keys entered using a keyboard. Such on-screen data may pose a security risk as it may be recognized and captured by any third-party user who may be in the field of view of the endpoint device.

Therefore, it may be advantageous to, among other things, provide a way to render encrypted data on an endpoint device display. It may also be advantageous to provide a way to render a decryption of the encrypted data on an external decryption device such that only a data owner of the encrypted data may view the decrypted data.

According to at least one embodiment, an endpoint device's on-screen data may be secured within a periphery of the endpoint device. In one embodiment, the periphery may include an area/domain where an authorized user/device may have access and permission to connect with other authorized users/devices. In one embodiment, the periphery may be defined by a set of defined devices which may be given access to view and share their confidential on-screen data on the endpoint devices. Any unauthorized user/device that comes within range of the periphery may not have access to the authorized devices and associated data.

According to at least one embodiment, no one other than a data owner having an external decryption device and using a passphrase associated with the on-screen data may access the on-screen data within the periphery defined by the endpoint device. In one embodiment, the external decryption device may include an augmented reality (AR) device, a virtual reality (VR) device, and/or a mixed reality device. In one embodiment, the external decryption device may connect to the endpoint device with an authentication mechanism, such as, for example, the data owner's access key. This first level security may help the data owner to encrypt the on-screen/open data and prevent an unauthorized user, within the periphery of the endpoint device, from stealing the on-screen data.

According to at least one embodiment, the data owner may want to share the on-screen data with a secondary user within the periphery of the endpoint device. As such, the data owner may enable a secondary external decryption device to display the decrypted on-screen data through a passcode set by the data owner. In one embodiment, the data owner may be responsible for generating the passcode and sharing the passcode with other secondary users to enable the secondary users to view the decryption of the encrypted on-screen data using their respective secondary external decryption devices. In one embodiment, the primary device owner may also set the attribute to the passcode such as read-only permission so that other users may only see the on-screen data and may not be able to take photograph of it using AR/VR glasses. AR/VR glasses which are once enabled through the passcode may be able to connect to data owner endpoint device within the periphery of the endpoint device. However, if the other users move outside of that periphery, they may lose the connection between their AR/VR glasses and the endpoint device.

According to at least one embodiment, the AR/VR glasses may have the capability of decrypting the encrypted data, identifying itself when it comes within the periphery of the endpoint device, and connecting to other devices within the periphery using a passphrase. It is contemplated that this approach may enable all of the devices in the periphery to stay in sync.

According to one embodiment, on-screen data may be encrypted with a defined encryption method if the endpoint device has enabled the screen privacy feature while the data owner is in a public or crowded space where the chance of data theft may be higher. In at least one embodiment, the screen privacy feature may also be enabled automatically based on the data owner's application usage and the data sensitive level of the same application.

According to at least one embodiment, external hardware devices, such as, for example, the AR/VR device, may need to be validated over a secured periphery or domain. In some embodiments, the AR/VR device may follow multi-factor authentication based on the data owner's security policy. In at least one embodiment, the AR/VR device may only be able to access the decrypted data when it is located in the defined periphery. In one embodiment, the defined periphery may be resized manually based on the data owner or automatically based on the identified location and calculated probability of data theft.

According to at least one embodiment, the AR/VR device may be registered with the data owner's endpoint device using a registration method which may provide a registration number and associated expiration date of the registration number. As such, the AR/VR device may have access to the data from data owner's device within the defined periphery and until the expiration date.

According to at least one embodiment, the data owner may define a privacy policy for another user and their respective AR/VR device. In one embodiment, the privacy policy may indicate the data permissions granted to the another user, such as, read-only, read-write, photographable, or shareable. As such, the AR/VR device may only perform the operation which is granted access to that AR/VR device.

According to at least one embodiment, the AR/VR device may have the ability to reset an authorization (e.g., user identification information or retina scan information) to dissociate from an existing user and associate with a new user by reverifying with a user verification process.

Referring to FIG. 1, an exemplary networked computer environment 100 in accordance with one embodiment is depicted. The networked computer environment 100 may include a client computer 102 with a processor 104 and a data storage device 106 that is enabled to run a software program 108 and a data security program 110a. The networked computer environment 100 may also include a server computer 112 that is enabled to run a data security program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data security program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data security program 110a, 110b (respectively) to encrypt a sensitive data that is rendered on a computer screen and enable access to a decryption of the sensitive data via an authorized external decryption device that is only visible to the user. Embodiments of the present disclosure are explained in more detail below with respect to FIGS. 2 to 5.

Figure 2:
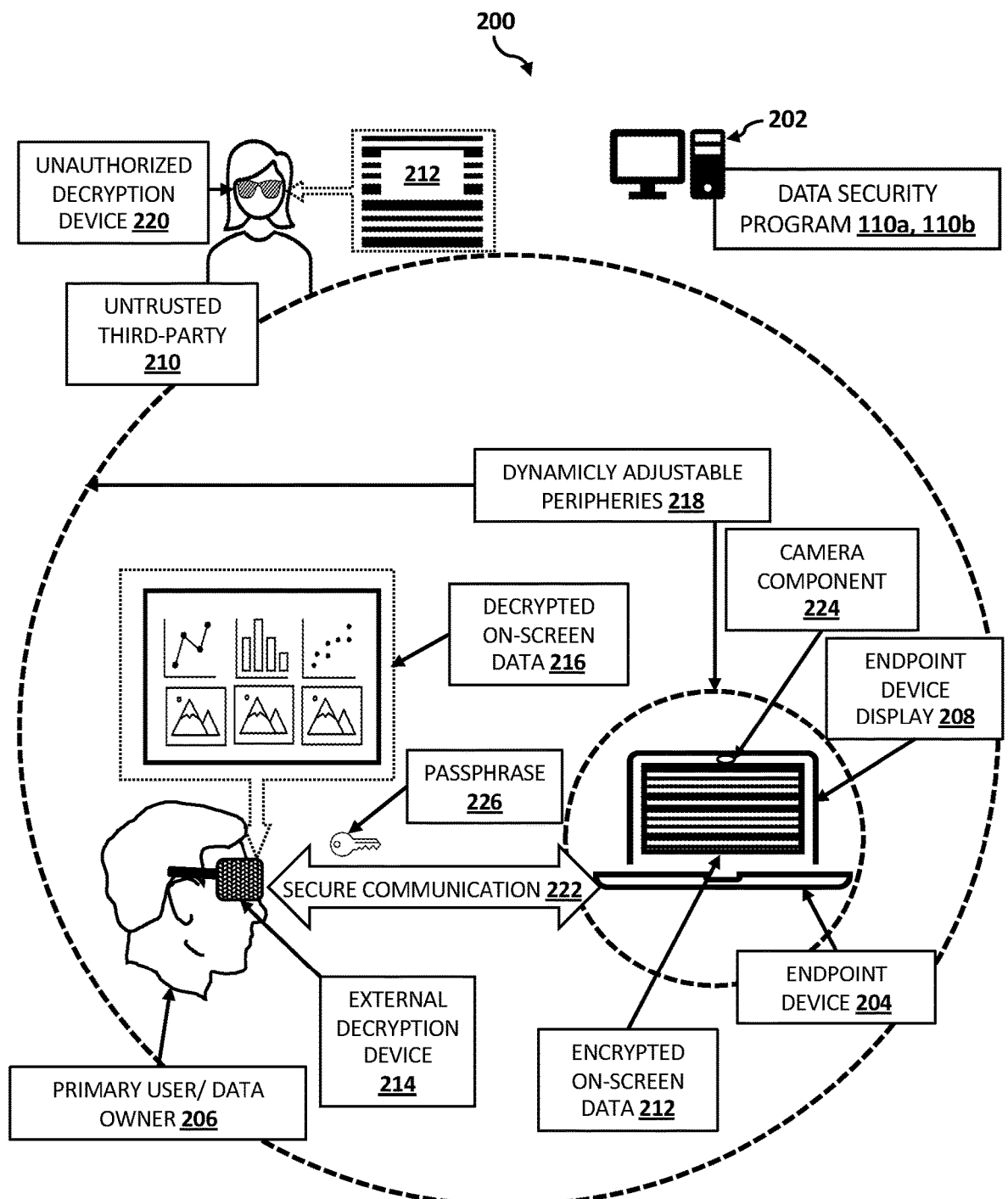
FIG. 2 is a schematic block diagram of a data security environment according to at least one embodiment.

Referring now to FIG. 2, a schematic block diagram of a data security environment 200 implementing the data security program 110a, 110b according to at least one embodiment is depicted. According to one embodiment, the data security environment 200 may include one or more components (e.g., client computer 102; server computer 112; communication network 116) of the computer environment 100 discussed above with reference to FIG. 1.

According to one embodiment, the data security environment 200 may include a computer system 202 having a tangible storage device and a processor that is enabled to run the data security program 110a, 110b. In one embodiment, the computer system 202 may include one or more client computers 102 and/or one or more server computers 112. In various embodiments, the client computer 102 and/or the server computer 112 of the computer system 202 may include a workstation, a personal computing device, a laptop computer, a desktop computer, a thin-client terminal, a tablet computer, a smart telephone, a smart watch or other smart wearable, or other electronic devices.

In one embodiment, the computer system 202 may comprise a distributed computing system including an endpoint device 204 (e.g., client computer 102 or server computer 112) deployed over a communication network (e.g., communication network 116). In one embodiment, the endpoint device 204 may perform as a user endpoint for a primary user 206 to access data from the communication network. According to one embodiment, the primary user 206 may include a data owner who is accountable for administering, securing, and controlling access to data assets that may be accessible via the endpoint device 204. In one embodiment, data accessed/processed via the endpoint device 204 may be rendered onto an endpoint device display 208 for viewing by the primary user 206. In one embodiment, the data rendered on the endpoint device display 208 may include confidential and/or private information (e.g., sensitive data) which the primary user 206 may want to prevent from being viewed (e.g., physically on the endpoint device display 208) or captured (e.g., photograph of the endpoint device display 208) by other people, such as, for example, an untrusted third-party 210 located near the endpoint device display 208.

According to one embodiment, data security program 110a, 110b may be implemented to protect sensitive data displayed to the primary user 206 on the endpoint device display 208 from a "shoulder surfing" untrusted third-party 210 in a vicinity of the endpoint device display 208. In one implementation, the data security program 110a, 110b may encrypt or encode the sensitive data and render/display the encrypted data on the endpoint device display as an encrypted on-screen data 212. According to one embodiment, the data security program 110a, 110b may generate the encrypted on-screen data 212 such that the encrypted on-screen data 212 may be indecipherable to the naked eye. Therefore, even if the untrusted third-party 210 is able to see the endpoint device display 208, the untrusted third-party 210 may only see the encrypted on-screen data 212 and not the underlying sensitive data.

According to one embodiment, the computer system 202 may include an external decryption device 214 which may enable the primary user 206 to privately view the underlying sensitive data (e.g., decrypted on-screen data 216) decrypted from the encrypted on-screen data 212. In at least one embodiment, the external decryption device 214 may include an augmented reality (AR) device and/or a virtual reality (VR) device having a head-mounted display, as shown in FIG. 2. In one embodiment, the external decryption device 214 may include the form-factor of a pair of glasses or a headset such that only the wearer (e.g., primary user 206) of the external decryption device 214 may view the sensitive data (e.g., decrypted on-screen data 216). In at least one embodiment, the external decryption device 214 may be enabled using an embedded chip including one or more processors, a memory storage, and an internet of things (IoT) enabled sensor. In one embodiment, the external decryption device 214, via the IoT enabled sensor, may be able to identify its location to the endpoint device 204 when the external decryption device 214 is within a vicinity of the endpoint device 204. In one embodiment, the IoT enabled sensor may also enable the data security program 110a, 110b to initiate a secure communication 222 between the endpoint device 204 and the external decryption device 214 using short-range wireless technologies, such as, for example, Wi-Fi, Bluetooth® (Bluetooth and all Bluetooth-based trademarks and logos are trademarks or registered trademarks of Bluetooth SIG, Inc. and/or its affiliates), near field communication (NFC), and radio-frequency identification (RFID).

According to one embodiment, the data security program 110a, 110b may enable the external decryption device 214 to work (e.g., to decrypt the encrypted on-screen data 212) only if the external decryption device 214 is used by the primary user 206 within a defined proximity of the endpoint device 204. That is, the data security program 110a, 110b may enable the endpoint device 204 to set an area/domain (relative to the endpoint device 204) in which other devices (e.g., external decryption device 214) may be authorized to decrypt the encrypted on-screen data 212. More specifically, the data security program 110a, 110b may enable the endpoint device 204 to determine its point location and define a dynamically adjustable periphery 218 or geofence around that point location to define an area in which other devices may have permission to connect with the endpoint device 204. In some embodiments, the dynamically adjustable periphery 218 may be defined by one or more authorized devices within the dynamically adjustable periphery 218 that may be given access to view and share the sensitive data rendered on the endpoint device display 208. In some embodiments, the data security program 110a, 110b may enable the primary user 206 to manually resize the dynamically adjustable periphery 218. In some embodiments, the data security program 110a, 110b may automatically resize the dynamically adjustable periphery 218 based on an identified location of the endpoint device 204 and the probability of data theft in that identified location (e.g., crowded train versus quiet library). In one embodiment, the endpoint device 204 may include a camera component 224 which the data security program 110a, 110b may implement to scan for potential untrusted third-parties 210 within the field of view of the endpoint device 204. In one embodiment, the data security program 110a, 110b may define the dynamically adjustable periphery 218 to exclude any identified untrusted third-parties 210 from within the dynamically adjustable periphery 218.

According to one embodiment, if an authorized device/user (e.g., primary user 206 and external decryption device 214) is located outside or moves outside of the dynamically adjustable periphery 218, the authorized device/user may not have access to decrypt the encrypted on-screen data 212. In another embodiment, if an unauthorized device/user (e.g., untrusted third-party 210 using an unauthorized decryption device 220) is located outside of the dynamically adjustable periphery 218, the unauthorized device/user may not have access to decrypt the encrypted on-screen data 212. Further, if the unauthorized device/user comes within the dynamically adjustable periphery 218, the unauthorized device/user may not have access to decrypt the encrypted on-screen data 212.

According to one embodiment, the data security program 110a, 110b may enable the primary user 206 to register their external decryption device 214 with the endpoint device 204 prior to using the external decryption device 214 with the endpoint device 204. In one embodiment, the registration process may include the primary user 206 entering authentication information (e.g., user identification and password) via a registration platform of the data security program 110a, 110b and storing the authentication information with a unique registration identifier (e.g., registration number) associated with the external decryption device 214.

In one embodiment, the registration process may also include performing a retina scan of the primary user 206 using the external decryption device 214 (e.g., via retina scanning component) and storing the retina scan of the primary user 206 with the unique registration identifier of the external decryption device 214. Accordingly, the external decryption device 214 may be authenticated if a retina scan of the wearer matches that of the retina scan stored with the registration of the external decryption device 214. Thus, if the external decryption device 214 is lost, no other user may use the external decryption device 214 to access the sensitive data. In other embodiments, the registration process may also include storing other biometric characteristics of the primary user 206 (e.g., finger print, voice print) for future authentication.

According to one embodiment, the data security program 110a, 110b may implement multi-factor authentication prior to granting the primary user 206 access to the decrypted on-screen data 216 using the external decryption device 214. In one embodiment, the data security program 110a, 110b may provide the primary user 206 with a user access key following the registration process. During the authentication process, the data security program 110a, 110b may transmit a challenge to the primary user 206 requesting the user access key as one level of security. In one embodiment, the data security program 110a, 110b may transmit a challenge to the primary user 206 requesting a biometric characteristic (e.g., matching retina scan) as another level of security. In at least one embodiment, the data security program 110a, 110b may transmit a challenge to identify the location of the primary user 206/external decryption device 214 (e.g., to determine if the primary user 206/external decryption device 214 is within the dynamically adjustable periphery 218) as a further level of security.

According to one embodiment, the data security program 110a, 110b may implement the user access key as a cryptographic key (e.g., encryption key) for encrypting the sensitive data into the encrypted on-screen data 212. In one embodiment, the encrypted on-screen data 212 may be generated using an encryption algorithm defined on the endpoint device 204. In one embodiment, the data security program 110a, 110b may also implement the user access key as the cryptographic key (e.g., decryption key) for decrypting the encrypted on-screen data 212. In one embodiment, the data security program 110a, 110b may enable the primary user 206 to generate a passphrase 226 which may then be used to derive the user access key (e.g., encryption and decryption key). As such, the primary user 206 may only have to provide the passphrase 226 and the external decryption device 214 may implement a decryption algorithm corresponding to the encryption algorithm used by the endpoint device 204 when generating the encrypted on-screen data 212.

According to one embodiment, the external decryption device 214 may include an optical see-through mechanism as in AR devices. In such embodiments, following the decryption process, the resulting decrypted data may be transmitted onto a display of the external decryption device 214 such that the decrypted on-screen data 216 may appear overlaid on the endpoint device display 208 when the endpoint device display 208 is viewed through the display of the external decryption device 214. In another embodiment, the display glass of the external decryption device 214 may receive light emitted by the endpoint device display 208 and modify the light so as to render the encrypted on-screen data 212 readable when the endpoint device display 208 is viewed through the display glass of the external decryption device 214.

According to another embodiment, the external decryption device 214 may include a video mechanism as in VR devices. In such embodiments, the decrypted on-screen data 216 may appear overlaid on the endpoint device display 208 as a video transmitted onto the display of the external decryption device 214.

According to one embodiment, the data security program 110a, 110b may be enabled to set and/or update one or more security policies for encrypting data, decrypting data, and accessing the decrypted data. In one embodiment, the data security program 110a, 110b may enable the primary user 206 to set and/or modify the security policies manually. In some embodiments, the data security program 110a, 110b may be enabled to automatically and dynamically set and/or update the one or more security policies.

In one embodiment, the security policy may be determined based on a location of the endpoint device 204 and the endpoint device owner (e.g., primary user 206) and the probability of data theft in that determined location. In high risk locations (e.g., crowded environments), the data security program 110a, 110b may automatically implement a screen security feature (e.g., render encrypted on-screen data 212 on endpoint device display 208).

In one embodiment, the data security program 110a, 110b may implement the camera component 224 to scan the endpoint device field of view to identify who is in its proximity (e.g., within the dynamically adjustable periphery 218). If the camera component 224 identifies other individuals (e.g., untrusted third-party 210) within the dynamically adjustable periphery 218, the data security program 110a, 110b may automatically enable a screen security feature (e.g., render encrypted on-screen data 212 on endpoint device display 208). Similarly, the data security program 110a, 110b may automatically disable the screen security feature, if no other individuals are identified within the dynamically adjustable periphery 218.

In one embodiment, the security policy may be based on the application usage of the primary user 206 and a data sensitivity level of the underlying application data. If the data security program 110a, 110b determines that the data rendered on the endpoint device display 208 is sensitive data (e.g., the primary user 206 opens an electronic mail (e-mail) containing sensitive data), the data security program 110a, 110b may automatically encrypt the sensitive data (e.g., e-mail data) and display the encrypted on-screen data 212.

Figure 3:
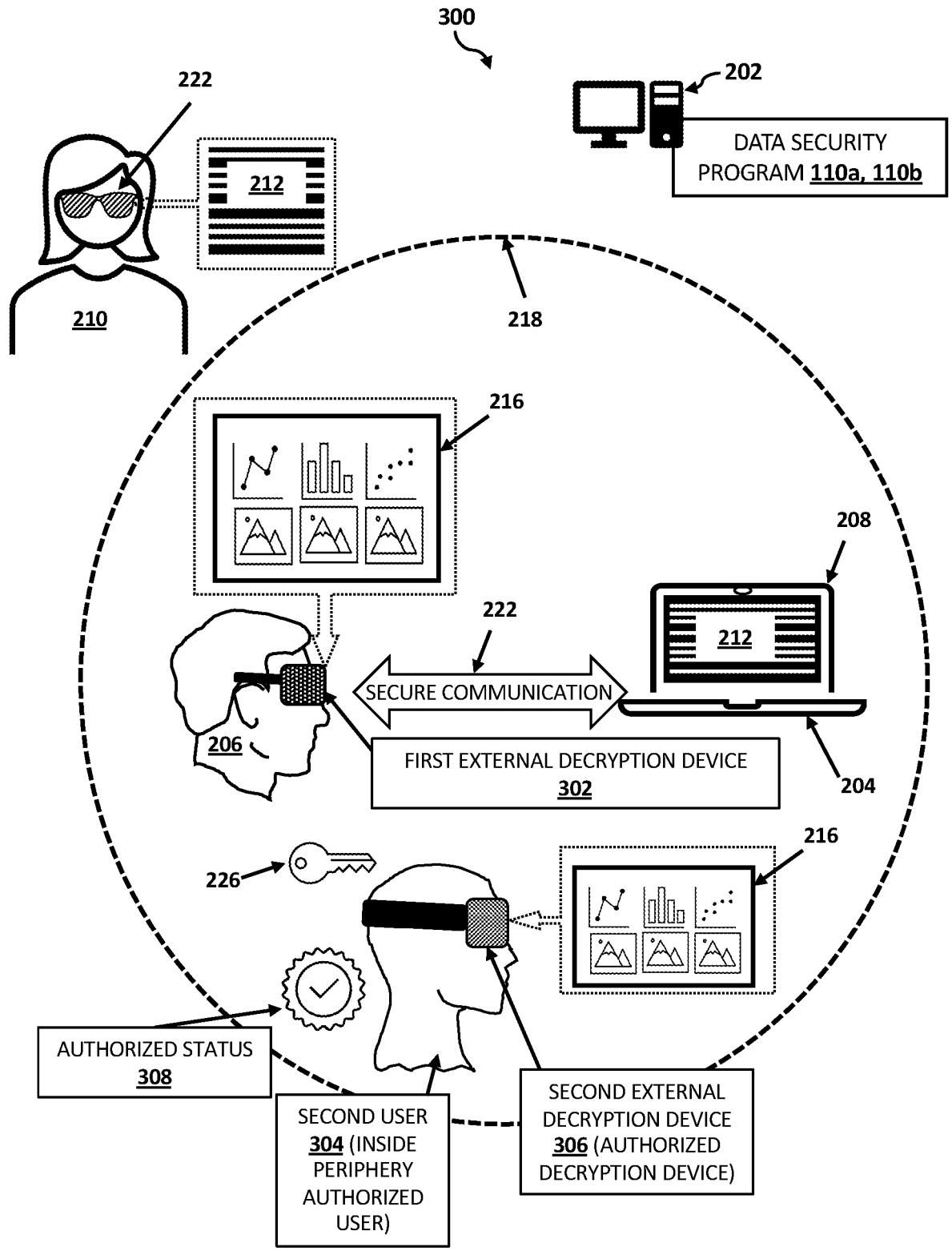
FIG. 3 is a schematic block diagram of another data security environment according to at least one embodiment.

Referring now to FIG. 3, a schematic block diagram of a data security environment 300 implementing the data security program 110a, 110b according to at least one embodiment is depicted. According to one embodiment, the data security environment 300 may include one or more components of the computer environment 100 discussed above with reference to FIG. 1 and one or more components of the data security environment 200 discussed above with reference to FIG. 2. As such, similar components from previous Figures may not be described with reference to FIG. 3.

According to one embodiment, the data security environment 300 may include the computer system 202 having a tangible storage device and a processor that is enabled to run the data security program 110a, 110b, as described previously with reference to FIG. 2.

In one embodiment, the computer system 202 may include the endpoint device 204 deployed over a communication network (e.g., communication network 116). As illustrated in FIG. 3, in some embodiments, there may be more than one user located within the dynamically adjustable periphery 218. In such embodiments, the endpoint device 204 may perform as a user endpoint for a primary user 206 (e.g., first user; data owner) to access data from the communication network.

In one embodiment, data accessed/processed via the endpoint device 204 may be rendered onto an endpoint device display 208 for viewing by the primary user 206. In one embodiment, the data rendered on the endpoint device display 208 may include confidential and/or private information (e.g., sensitive data) which the primary user 206 may want to prevent from being viewed (e.g., physically on the endpoint device display 208) or captured (e.g., photograph of the endpoint device display 208) by other people, such as, for example, an untrusted third-party 210 located near the endpoint device display 208.

In one implementation, the data security program 110a, 110b may encrypt or encode the sensitive data and render/display the encrypted data on the endpoint device display as an encrypted on-screen data 212. According to one embodiment, the data security program 110a, 110b may generate the encrypted on-screen data 212 such that the encrypted on-screen data 212 may be indecipherable to the naked eye. Therefore, even if the untrusted third-party 210 is able to see the endpoint device display 208, the untrusted third-party 210 may only see the encrypted on-screen data 212 and not the underlying sensitive data. Further, even if the untrusted third-party 210 uses a decryption device, such as, for example, the unauthorized decryption device 220, the unauthorized device/user may not have access to decrypt the encrypted on-screen data 212 for at least the reason that the untrusted third-party 210 is located outside of the dynamically adjustable periphery 218.

In one embodiment, the primary user 206 may use a first external decryption device 302 (e.g., similar to external decryption device 214) which may be enabled by the data security program 110a, 110b to communicate with the endpoint device 204 (e.g., via secure communication 222) to decrypt the encrypted on-screen data 212 and generate the decrypted on-screen data 216, as described previously with reference to external decryption device 214 in FIG. 2.

In one embodiment, a secondary or second user 304 having another external decryption device (e.g., second external decryption device 306) within the dynamically adjustable periphery 218, may request access to the data in the endpoint device 204. In one embodiment, the second external decryption device 306 may be similar to the first external encryption device 302 in that they both may have the function to identify themselves (e.g., via IoT sensors) to the endpoint device 204 when they are within the dynamically adjustable periphery 218. Further, the first external encryption device 302 and the second external decryption device 306 may both have the capability of decrypting the encrypted on-screen data 212 using the passphrase 226 from the primary user 206.

In one embodiment, the second user 304 may need to register the second external decryption device 306 with the endpoint device 204 prior to its use. In one embodiment, the data security program 110a, 110b may implement a registration process for the second external decryption device 306 in a manner that may be similar to registering the external decryption device 214 in FIG. 2 (although the second user 304 may register as a guest). According to one embodiment, the data security program 110a, 110b may implement multi-factor authentication (e.g., as described in FIG. 2) prior to granting the second user 304 access to the decrypted on-screen data 216 using the second external decryption device 306. In one embodiment, one of the authentication challenges from the data security program 110a, 110b to the second external decryption device 306 may include a request for the passphrase 226. It is contemplated that the passphrase 226 may be generated by the primary user 206 and shared with the second user 304 to enable their second external decryption device 306.

According to one embodiment, once the second user 304 is registered and authenticated, the data security program 110a, 110b may assign an authorized status 308 to the second user 304 (e.g., inside periphery authorized user) and the second external decryption device 306 (e.g., authorized decryption device) so long as the second user 304 remains within the dynamically adjustable periphery 218. In one embodiment, once the second external decryption device 306 is enabled using the passphrase 226, the second external decryption device 306 may connect to the endpoint device 204 (e.g., via secure communication 222) to access the decrypted on-screen data 216. However, if the second user 304 were to move out of the dynamically adjustable periphery 218, the second external decryption device 306 may lose the connection to the endpoint device 204 and may need to be validated again upon reentry.

According to one embodiment, the data security program 110a, 110b may enable the primary user 206 to set one or more attributes to the passphrase 226 shared with the second user 304/second external decryption device 306 to limit the level of access (e.g., permission) granted to the second user 304. In one embodiment, the attribute may be set to grant "read-only" permission so that the second user 304 may be able to read the decrypted on-screen data 216 using the second external decryption device 306 but may not be able to capture a photograph of the decrypted on-screen data 216 using the second external decryption device 306. In one embodiment, the data security program 110a, 110b may enable the primary user 206 to set the "read-only" permission as the default attribute for any second external decryption devices 306, unless the second external decryption device 306 is a familiar and trusted device to the endpoint device 204.

According to one embodiment, the data security program 110a, 110b may enable the primary user 206 to set an expiration date attribute to the passphrase 226 shared with the second user 304/second external decryption device 306. As such, the second external decryption device 306 may continue to have access to the decrypted on-screen data 216 until the date of expiration and while the second user 304/second external decryption device 306 remains within the dynamically adjustable periphery 218. In some embodiments, the data security program 110a, 110b may also enable attaching (e.g., set by the primary user 206 and/or the data security program 110a, 110b) an expiration date to the registration of the second external decryption device 306 to the endpoint device 204.

Figure 4:
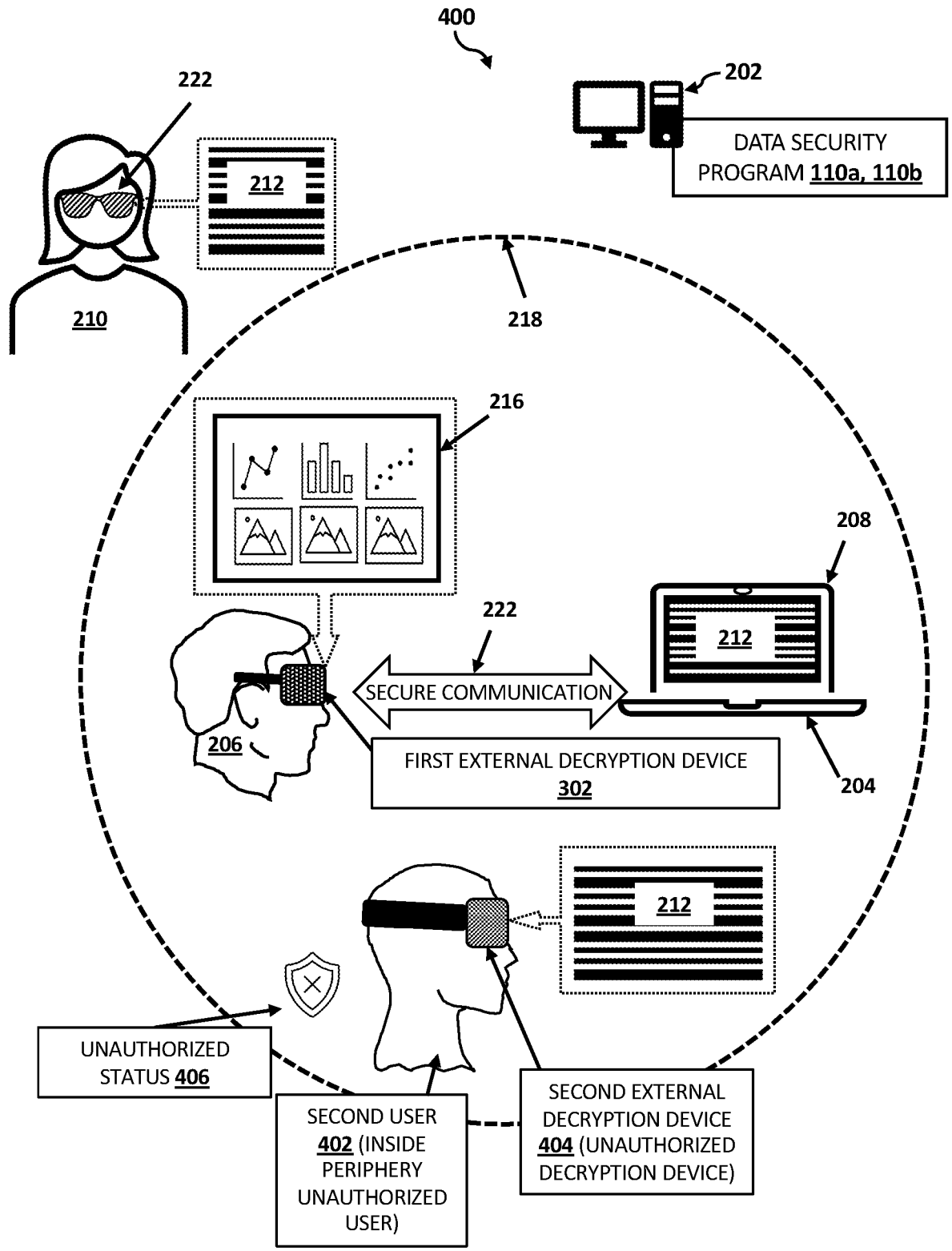
FIG. 4 is a schematic block diagram of a further data security environment according to at least one embodiment.

Referring now to FIG. 4, a schematic block diagram of a data security environment 400 implementing the data security program 110a, 110b according to at least one embodiment is depicted. According to one embodiment, the data security environment 400 may include one or more components of the computer environment 100 discussed above with reference to FIG. 1, one or more components of the data security environment 200 discussed above with reference to FIG. 2, and one or more components of data security environment 200 discussed above with reference to FIG. 2. As such, similar components from previous Figures may not be described with reference to FIG. 4.

According to one embodiment, the data security environment 400 may include the data security program 110a, 110b encrypting or encoding one or more sensitive data and rendering the encrypted data on the endpoint device display as the encrypted on-screen data 212. In one embodiment, the untrusted third-party 210, located outside of the dynamically adjustable periphery 218, may only see the encrypted on-screen data 212 and not the underlying sensitive data (with or without the unauthorized decryption device 220).

In one embodiment, the primary user 206 may use the first external decryption device 302 (e.g., similar to external decryption device 214) to communicate with the endpoint device 204 (e.g., via secure communication 222) to decrypt the encrypted on-screen data 212 and generate the decrypted on-screen data 216, as described previously with reference to external decryption device 214 in FIG. 2.

In one embodiment, another secondary or second user 402 having another external decryption device (e.g., second external decryption device 404) within the dynamically adjustable periphery 218, may request access to the data in the endpoint device 204. In one embodiment, second user 402 may be different from second user 304 described with reference to FIG. 3 in that the data security program 110a, 110b may assign an unauthorized status 406 to the second user 402 (e.g., inside periphery unauthorized user) and the second external decryption device 404 (e.g., authorized decryption device).

According to one embodiment, the data security program 110a, 110b may have assigned the unauthorized status 406 for one or more reasons. For example, if the second user 402 failed to register the second external decryption device 404 with the endpoint device 204 or the registration had expired, the data security program 110a, 110b may have assigned the unauthorized status 406. In another example, if the second user 402 failed the multi-factor authentication process, the data security program 110a, 110b may have assigned the unauthorized status 406. In a further example, if the second user 402 moved outside of the dynamically adjustable periphery 218 with the second external decryption device 404 and reentered inside the dynamically adjustable periphery 218, the second external decryption device 404 may have lost the connection to the endpoint device 204 and received the unauthorized status 406 from the data security program 110a, 110b. According to one embodiment, even though the second user 402 may be located within the dynamically adjustable periphery 218, the unauthorized status 406 may prevent the second external decryption device 404 from connecting with the endpoint device 204 to decrypt the encrypted on-screen data 212. Thus, the second user 402 may only be able to see the encrypted on-screen data 212.

Figure 5:
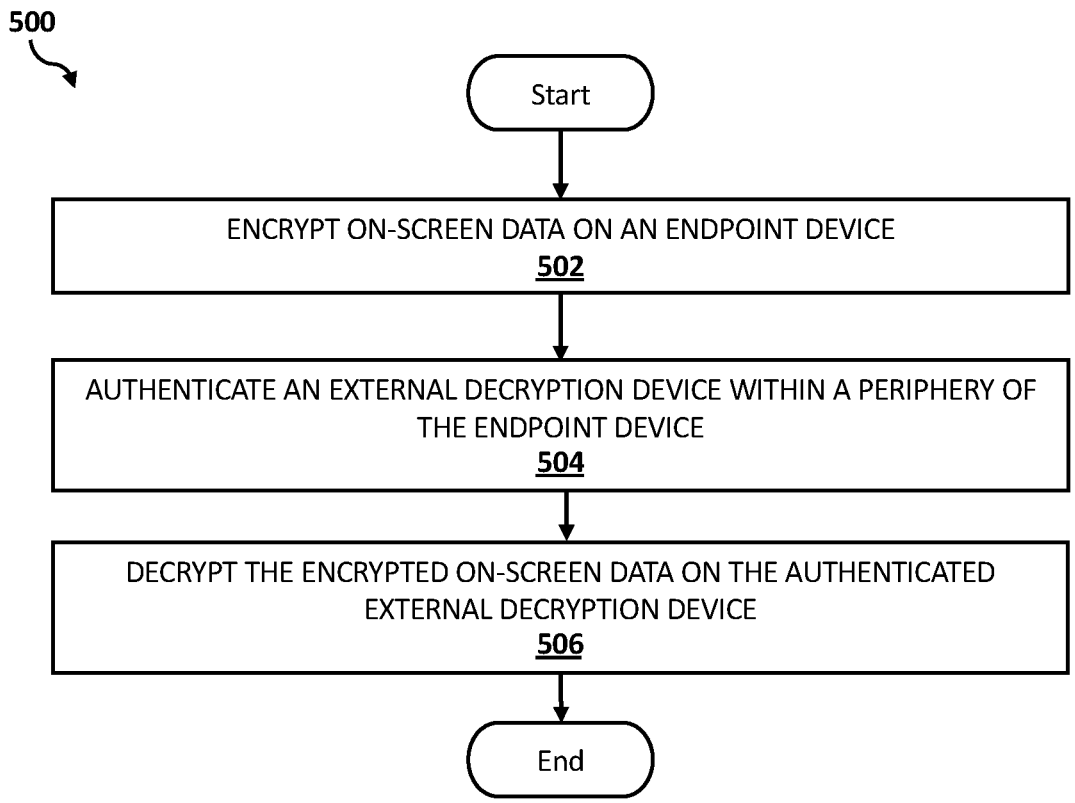
FIG. 5 is an operational flowchart illustrating a process for on-screen data security according to at least one embodiment.

Referring now to FIG. 5, an operational flowchart illustrating the exemplary on-screen data security process 500 used by the data security program 110a,110b according to at least one embodiment is depicted. According to one embodiment, the exemplary on-screen data security process 500 used by the data security program 110a,110b may be described with reference to FIGS. 2-4.

At 502, on-screen data is encrypted on an endpoint device. In one embodiment, data accessed/processed via the endpoint device may be rendered onto an endpoint device display for viewing by the primary user. In one embodiment, the data rendered on the endpoint device display may include confidential and/or private information (e.g., sensitive data) which the primary user may want to prevent from being viewed or captured by other people, such as, for example, an untrusted third-party located near the endpoint device display. In one implementation, the data security program 110a, 110b may encrypt or encode the sensitive data (e.g., using a defined encryption algorithm) and render/display the encrypted data on the endpoint device display as an encrypted on-screen data. According to one embodiment, the data security program 110a, 110b may generate the encrypted on-screen data such that the encrypted on-screen data may be indecipherable to the naked eye. According to one embodiment, the data security program 110a, 110b may encrypt the sensitive data in a manner such that decryption of the encrypted on-screen data may only be achieved if the encrypted on-screen data is viewed through an external decryption device, such as, for example, an AR device and/or VR device.

According to one embodiment, the data security program 110a, 110b may identify one or more security policies associated with the endpoint device to determine whether a screen privacy security feature (e.g., render encrypted on-screen data) is enabled for manual activation or automatic activation. In one embodiment, the security policy may be determined based on a location of the endpoint device and the endpoint device owner (e.g., primary user/data owner) and the probability of data theft in that determined location. In high risk locations (e.g., crowded environments), the data security program 110a, 110b may automatically implement the screen privacy security feature.

In one embodiment, the data security program 110a, 110b may implement a camera component of the endpoint device to scan the endpoint device field of view to identify who is in its proximity (e.g., within a defined periphery). If the camera component identifies other individuals (e.g., untrusted third-party) within the defined periphery, the data security program 110a, 110b may automatically enable a screen privacy security feature (e.g., render encrypted on-screen data on endpoint device display). Similarly, the data security program 110a, 110b may automatically disable the screen privacy security feature, if no other individuals are identified within the defined periphery.

In one embodiment, the security policy may be based on the application usage of the primary user and a data sensitivity level of the underlying application data. If the data security program 110a, 110b determines that the data rendered on the endpoint device display is sensitive data, the data security program 110a, 110b may automatically encrypt the sensitive data (e.g., e-mail data) and display the encrypted on-screen data on the endpoint device display.

Then at 504, an external decryption device within a periphery of the endpoint device is authenticated. According to one embodiment, the data security program 110*a*, 110*b* may enable the external decryption device 214 to work (e.g., to decrypt the encrypted on-screen data 212) only if the external decryption device 214 is used by the primary user 206 within a defined proximity of the endpoint device 204.

According to one embodiment, the data security program 110*a*, 110*b* may implement multi-factor authentication prior to granting the primary user access to the decrypted on-screen data using the external decryption device. In one embodiment, the data security program 110*a*, 110*b* may provide the primary user with a user access key following the registration process. During the authentication process, the data security program 110*a*, 110*b* may transmit a challenge to the primary user requesting the user access key as one level of security. In one embodiment, the data security program 110*a*, 110*b* may transmit a challenge to the primary user requesting a biometric characteristic (e.g., matching retina scan) as another level of security. In at least one embodiment, the data security program 110*a*, 110*b* may transmit a challenge to identify the location of the primary user/external decryption device (e.g., to determine if the primary user/external decryption device is within the dynamically adjustable periphery) as a further level of security.

According to one embodiment, the data security program 110*a*, 110*b* may implement the user access key as a cryptographic key (e.g., encryption key) for encrypting the sensitive data into the encrypted on-screen data. In one embodiment, the data security program 110*a*, 110*b* may enable the primary user to generate a passphrase which may then be used to derive the user access key. As such, during the authentication process, the data security program 110*a*, 110*b* may request the passphrase from the primary user, instead of the user access key, as one level of the multi-factor authentication.

According to one embodiment, the data security program 110*a*, 110*b* may authenticate multiple external decryption devices within the periphery of the endpoint device, as described previously with reference to FIG. 3. In one embodiment, the data security program 110*a*, 110*b* may implement a registration process for a second external decryption device in a manner that may be similar to registering a first external decryption device (although the second external decryption device may be registered as a guest). According to one embodiment, the data security program 110*a*, 110*b* may implement multi-factor authentication (e.g., as described in FIG. 2) prior to granting the second user access to the decrypted on-screen data using the second external decryption device. In one embodiment, one of the authentication challenges from the data security program 110*a*, 110*b* to the second external decryption device may include a request for the passphrase that may be generated by the primary user and shared with the second user to enable the second external decryption device.

Thereafter at 506, the encrypted on-screen data is decrypted on the authenticated external decryption device. According to one embodiment, the data security program 110*a*, 110*b* may generate the encrypted on-screen data using an encryption algorithm defined on the endpoint device and the user access key as a cryptographic key (e.g., encryption key). In one embodiment, the data security program 110*a*, 110*b* may also implement the user access key as the cryptographic key (e.g., decryption key) for decrypting the encrypted on-screen data. As described previously, the data security program 110*a*, 110*b* may enable the primary user to generate a passphrase which may then be used to derive the user access key (e.g., encryption and decryption key). As such, for the decryption process, the primary user may only have to provide the passphrase and the external decryption device may implement a decryption algorithm corresponding to the encryption algorithm used by the endpoint device when generating the encrypted on-screen data.

According to one embodiment, the external decryption device may include an optical see-through mechanism as in AR devices. In such embodiments, following the decryption process, the resulting decrypted data may be transmitted onto a display of the external decryption device such that the decrypted on-screen data may appear overlaid on the endpoint device display when the endpoint device display is viewed through the display of the external decryption device. In another embodiment, the display glass of the external decryption device may receive light emitted by the endpoint device display and modify the light so as to render the encrypted on-screen data readable when the endpoint device display is viewed through the display glass of the external decryption device. According to another embodiment, the external decryption device may include a video mechanism as in VR devices. In such embodiments, the decrypted on-screen data may appear overlaid on the endpoint device display as a video transmitted onto the display of the external decryption device.

Accordingly, the data security program 110*a*, 110*b* may improve the functionality of a computer because the data security program 110*a*, 110*b* may enable a computer to automatically encrypt data that may be rendered on a computer screen, based on the sensitivity of the data, the location of the computer, and the individuals located around the computer. Further, the data security program 110*a*, 110*b* may enable a computer to render a decryption of the encrypted data on an external display that may only be in the view of the data owner.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
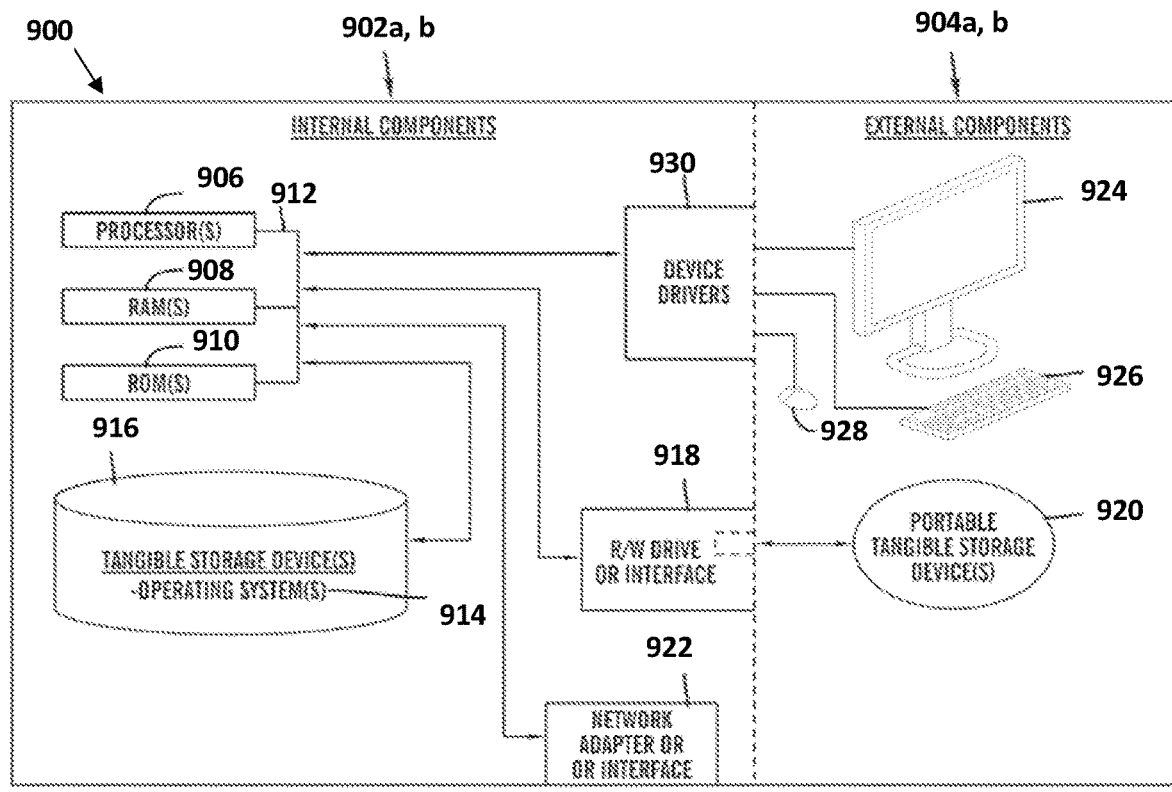
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902*a, b* and external components 904*a, b* illustrated in FIG. 6. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the data security program 110a in client computer 102, and the data security program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data security program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the data security program 110a in client computer 102 and the data security program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data security program 110a in client computer 102 and the data security program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
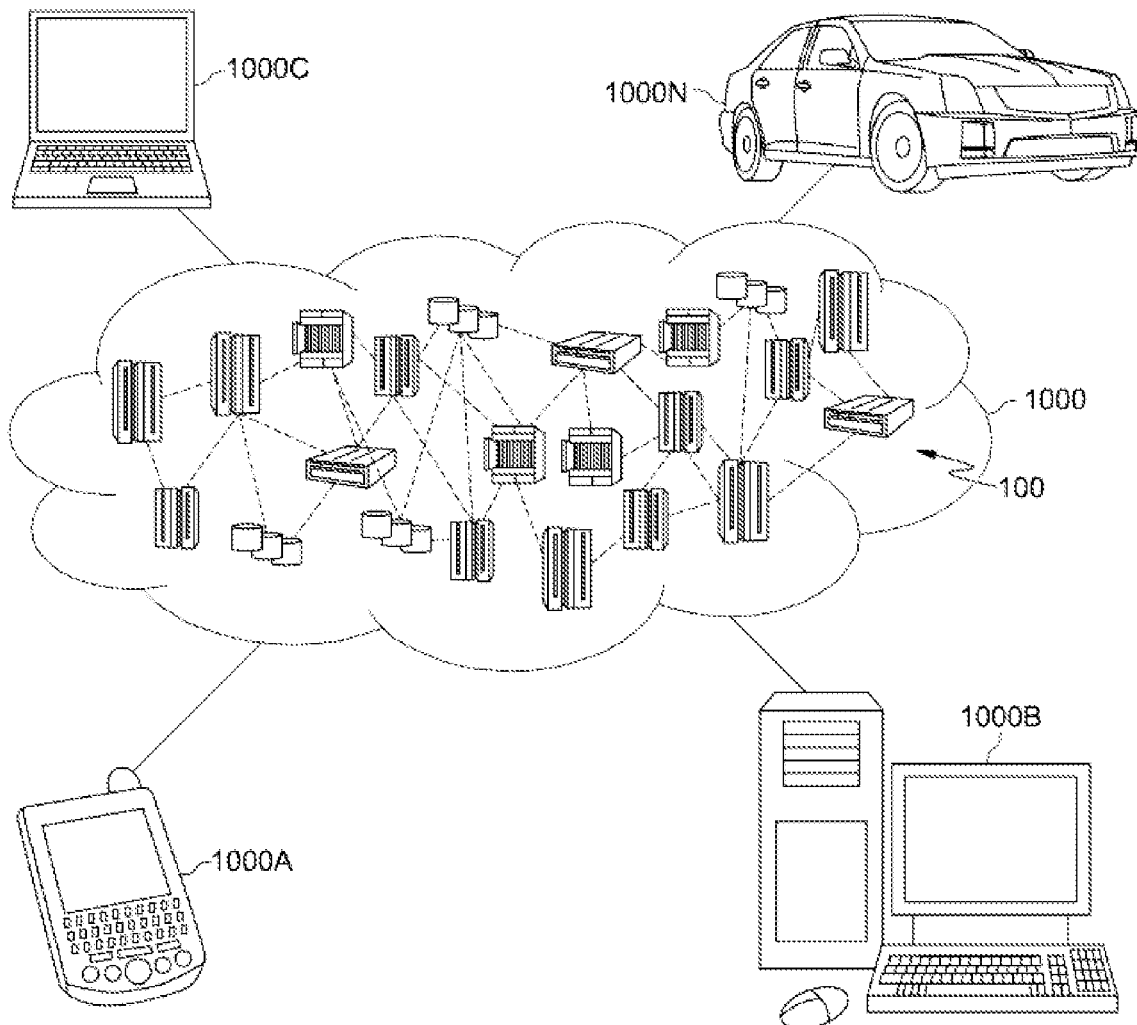
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
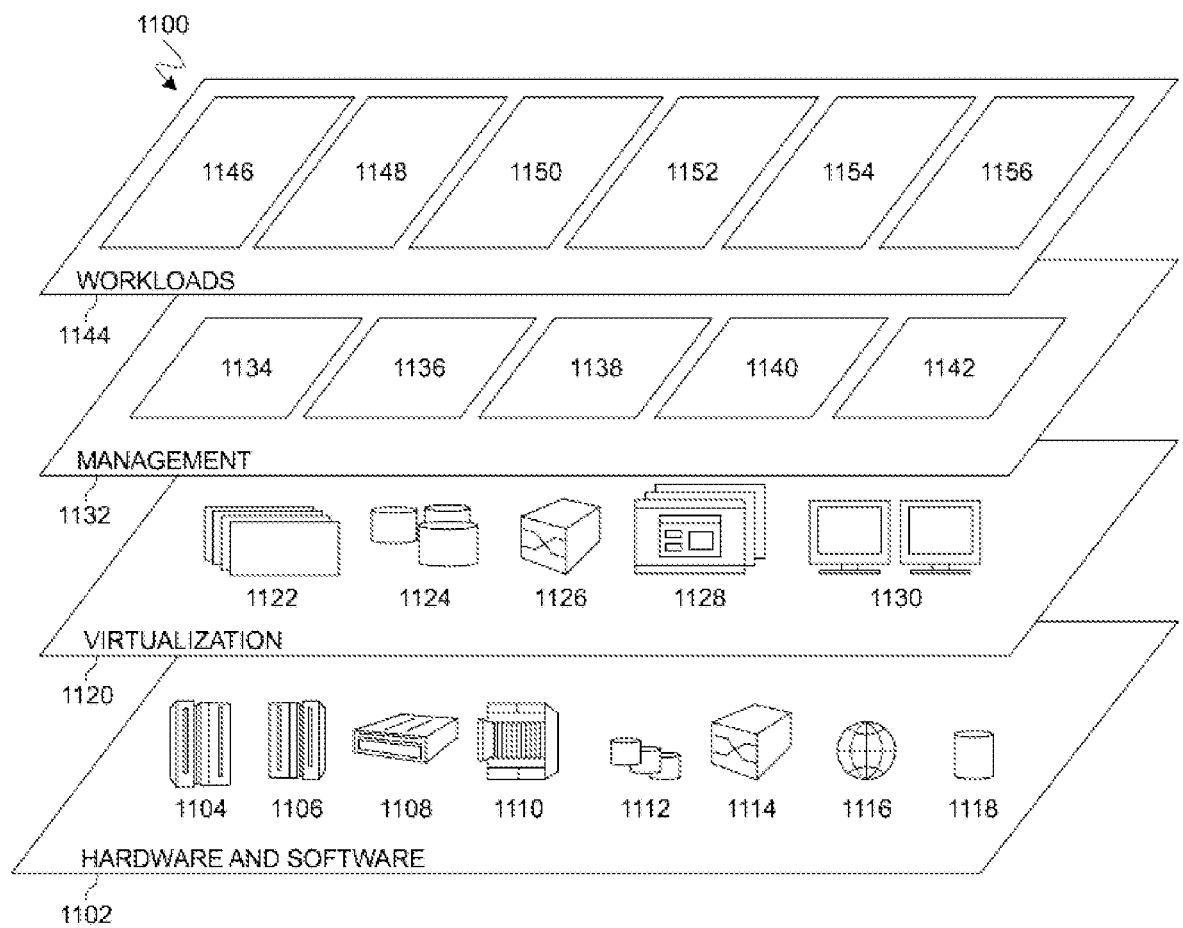
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data security 1156. A data security program 110a, 110b provides a way to encrypt a sensitive data that is rendered on a computer screen and enable access to a decryption of the sensitive data via an authorized external decryption device that is only visible to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   encrypting an on-screen data for viewing by a primary user, wherein the encrypted on-screen data is rendered on a display of an endpoint device of the primary user based on a security policy set by the primary user;
   identifying a second external decryption device within a periphery defined by the endpoint device based on the security policy set by the primary user, wherein the identified second external decryption device is associated with a secondary user;
   transmitting a challenge to the identified second external decryption device including a request for a passphrase generated by the primary user of the endpoint device; and
   authenticating the identified second external decryption device based on receiving a response from the identified second external decryption device including the passphrase generated by the primary user of the endpoint device; and decrypting the encrypted on-screen data for viewing by the secondary user using the authenticated identified second external decryption device.

2. The method of claim 1, wherein encrypting the on-screen data rendered on the display of the endpoint device further comprises:
    detecting, using a camera component of the endpoint device, at least one untrusted third-party within a field of view of the display of the endpoint device; and
    in response to the detected at least one untrusted third-party, automatically generating the encrypted on-screen data rendered on the display of the endpoint device.

3. The method of claim 1, further comprising:
    detecting, using a camera component of the endpoint device, at least one untrusted third-party within a field of view of the display of the endpoint device; and
    dynamically adjusting, using the endpoint device, a size of the periphery to exclude the detected at least one untrusted third-party from within the periphery.

4. The method of claim 1, further comprising:
    identifying a location of the endpoint device to determine whether the endpoint device is in a public space or a private space;
    calculating a probability of data theft in the identified location of the endpoint device; and
    dynamically adjusting, using the endpoint device, a size of the periphery relative to the endpoint device based on the calculated probability of data theft.

5. The method of claim 1, wherein encrypting the on-screen data rendered on the display of the endpoint device further comprises:
    analyzing a sensitivity level of an application data rendering on the display of the endpoint device; and
    in response to determining that the application data rendering on the display of the endpoint device includes at least one sensitive data, automatically encrypting the at least one sensitive data to generate the encrypted on-screen data.

6. The method of claim 1, further comprising:
    identifying, in the passphrase generated by the primary user, an access level limitation associated with the authenticated second external decryption device, wherein the identified access level limitation is set by the primary user; and
    limiting access to a decrypted on-screen data for the authenticated second external decryption device based on the identified access level limitation.

7. A computer system for securing visible data, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    encrypting an on-screen data for viewing by a primary user, wherein the encrypted on-screen data is rendered on a display of an endpoint device of the primary user based on a security policy set by the primary user;
    identifying a second external decryption device within a periphery defined by the endpoint device based on the security policy set by the primary user, wherein the identified second external decryption device is associated with a secondary user;
    transmitting a challenge to the identified second external decryption device including a request for a passphrase generated by the primary user of the endpoint device; and
    authenticating the identified second external decryption device based on receiving a response from the identified second external decryption device including the passphrase generated by the primary user of the endpoint device; and
    decrypting the encrypted on-screen data for viewing by the secondary user using the authenticated identified second external decryption device.

8. The computer system of claim 7, wherein encrypting the on-screen data rendered on the display of the endpoint device further comprises:
    detecting, using a camera component of the endpoint device, at least one untrusted third-party within a field of view of the display of the endpoint device; and
    in response to the detected at least one untrusted third-party, automatically generating the encrypted on-screen data rendered on the display of the endpoint device.

9. The computer system of claim 7, further comprising:
    detecting, using a camera component of the endpoint device, at least one untrusted third-party within a field of view of the display of the endpoint device; and
    dynamically adjusting, using the endpoint device, a size of the periphery to exclude the detected at least one untrusted third-party from within the periphery.

10. The computer system of claim 7, further comprising:
    identifying a location of the endpoint device to determine whether the endpoint device is in a public space or a private space;
    calculating a probability of data theft in the identified location of the endpoint device; and
    dynamically adjusting, using the endpoint device, a size of the periphery relative to the endpoint device based on the calculated probability of data theft.

11. The computer system of claim 7, wherein encrypting the on-screen data rendered on the display of the endpoint device further comprises:
    analyzing a sensitivity level of an application data rendering on the display of the endpoint device; and
    in response to determining that the application data rendering on the display of the endpoint device includes at least one sensitive data, automatically encrypting the at least one sensitive data to generate the encrypted on-screen data.

12. The computer system of claim 7, further comprising:
    identifying, in the passphrase generated by the primary user, an access level limitation associated with the authenticated second external decryption device, wherein the identified access level limitation is set by the primary user; and
    limiting access to a decrypted on-screen data for the authenticated second external decryption device based on the identified access level limitation.

13. A computer program product for securing visible data, comprising:
    one or more computer-readable storage media and program instructions collectively stored on the one or more computer-readable storage media, the program instructions executable by a processor to cause the processor to perform a method comprising:
    encrypting an on-screen data for viewing by a primary user, wherein the encrypted on-screen data is rendered on a display of an endpoint device of the primary user based on a security policy set by the primary user;

identifying a second external decryption device within a periphery defined by the endpoint device based on the security policy set by the primary user, wherein the identified second external decryption device is associated with a secondary user;

transmitting a challenge to the identified second external decryption device including a request for a passphrase generated by the primary user of the endpoint device; and authenticating the identified second external decryption device based on receiving a response from the identified second external decryption device including the passphrase generated by the primary user of the endpoint device; and decrypting the encrypted on-screen data for viewing by the secondary user using the authenticated identified second external decryption device.

14. The computer program product of claim 13, wherein encrypting the on-screen data rendered on the display of the endpoint device further comprises:

detecting, using a camera component of the endpoint device, at least one untrusted third-party within a field of view of the display of the endpoint device; and in response to the detected at least one untrusted third-party, automatically generating the encrypted on-screen data rendered on the display of the endpoint device.

15. The computer program product of claim 13, further comprising:

detecting, using a camera component of the endpoint device, at least one untrusted third-party within a field of view of the display of the endpoint device; and dynamically adjusting, using the endpoint device, a size of the periphery to exclude the detected at least one untrusted third-party from within the periphery.

16. The computer program product of claim 13, further comprising:

identifying a location of the endpoint device to determine whether the endpoint device is in a public space or a private space;

calculating a probability of data theft in the identified location of the endpoint device; and dynamically adjusting, using the endpoint device, a size of the periphery relative to the endpoint device based on the calculated probability of data theft.

17. The computer program product of claim 13, wherein encrypting the on-screen data rendered on the display of the endpoint device further comprises:

analyzing a sensitivity level of an application data rendering on the display of the endpoint device; and in response to determining that the application data rendering on the display of the endpoint device includes at least one sensitive data, automatically encrypting the at least one sensitive data to generate the encrypted on-screen data.

\* \* \* \* \*